May 9, 1967 E. V. HARDWAY, JR 3,319,252
GRAPHIC RECORDER FOR SEQUENTIAL PLOTTING OF ANALOG VALUES
Filed Feb. 15, 1966 5 Sheets-Sheet 1
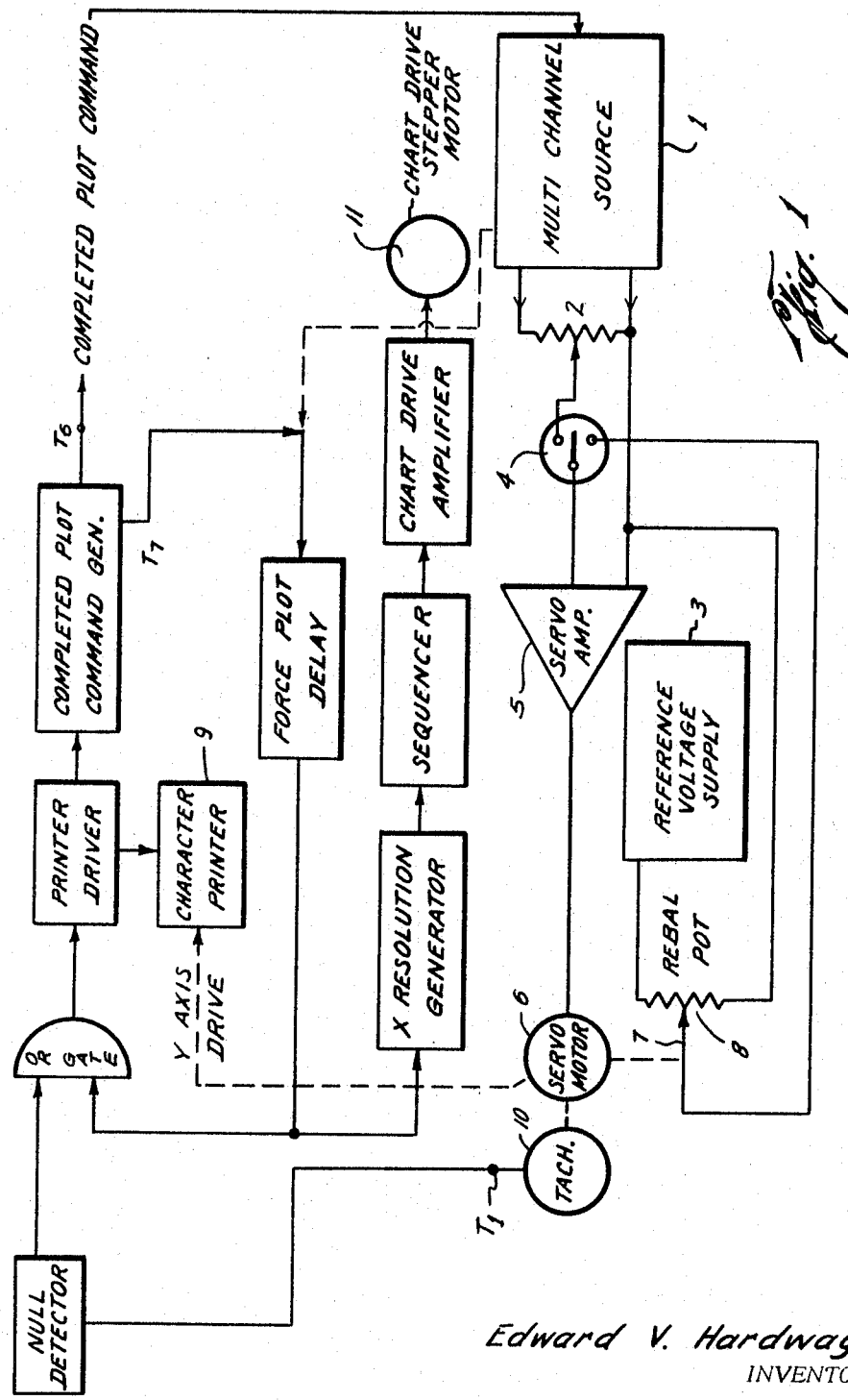
Edward V. Hardway, Jr.
INVENTOR.
BY Browning, Simms,
Hyer & Eickenroht
ATTORNEYS

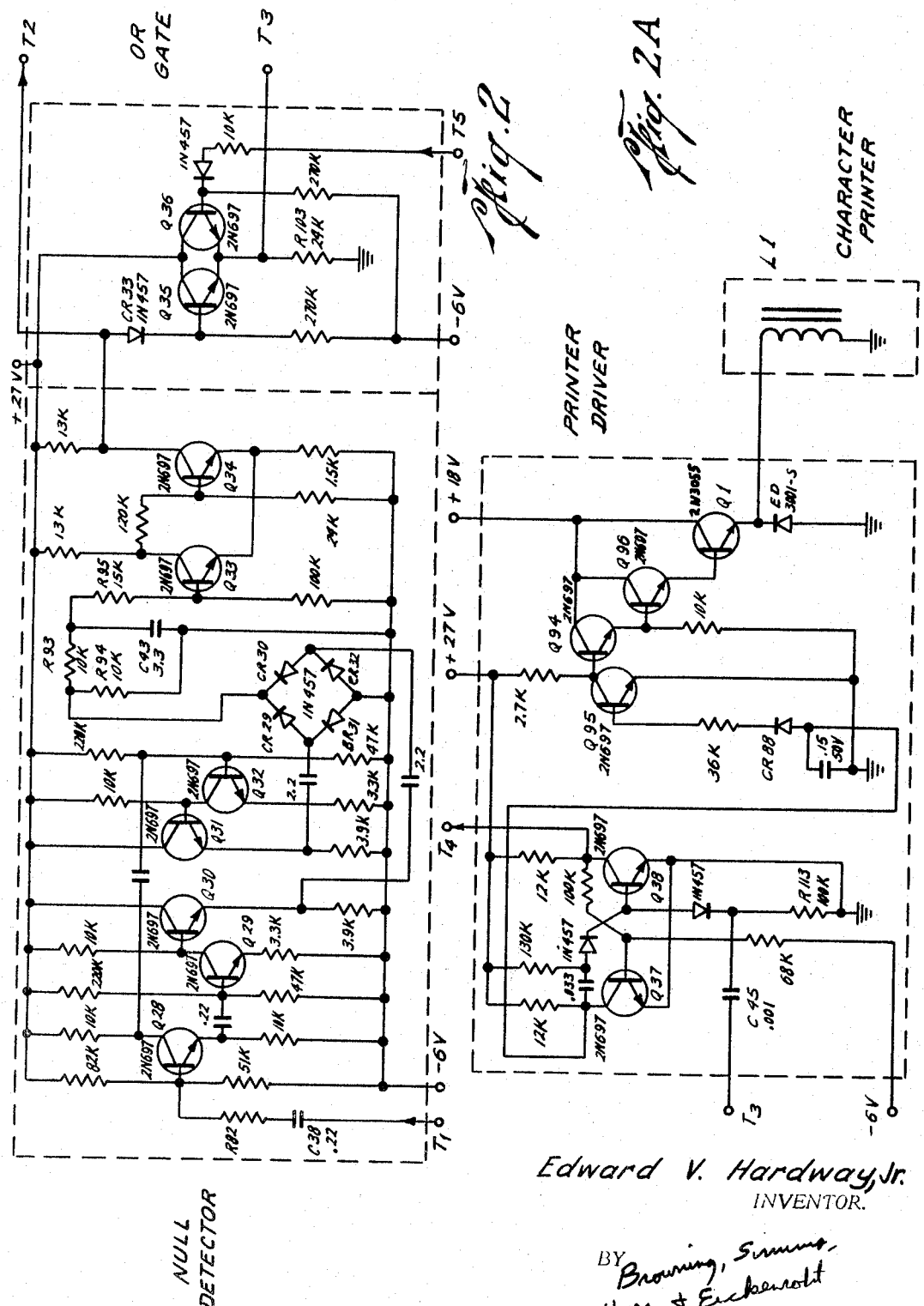

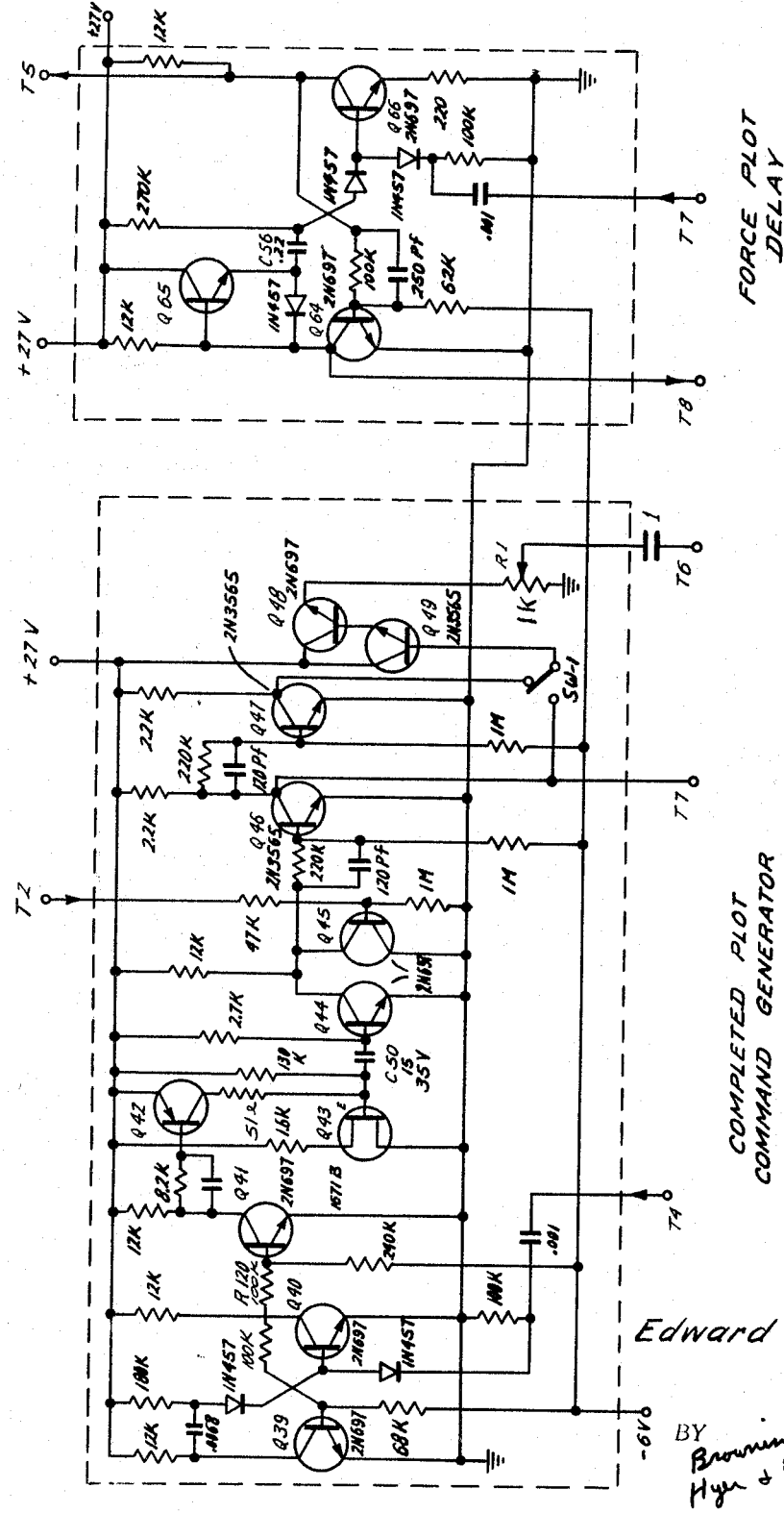

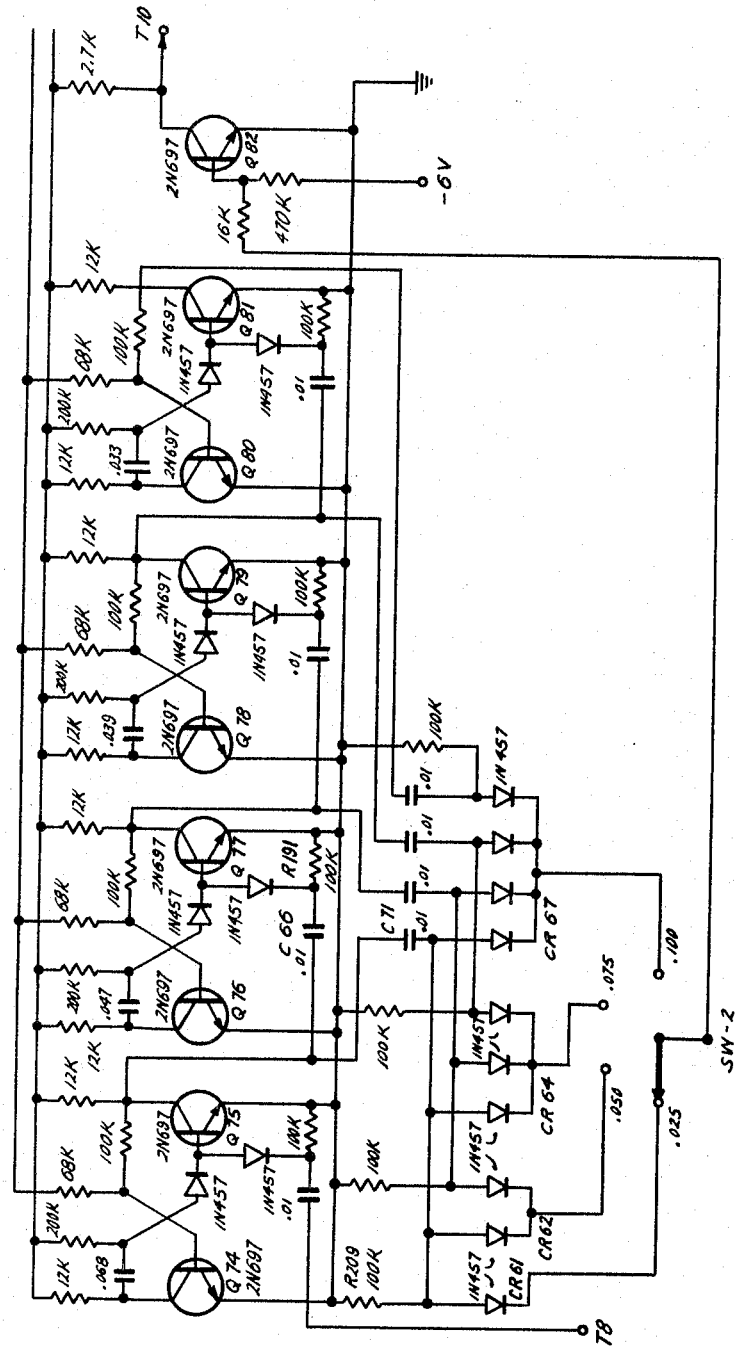

May 9, 1967 E. V. HARDWAY, JR 3,319,252
GRAPHIC RECORDER FOR SEQUENTIAL PLOTTING OF ANALOG VALUES
Filed Feb. 15, 1966
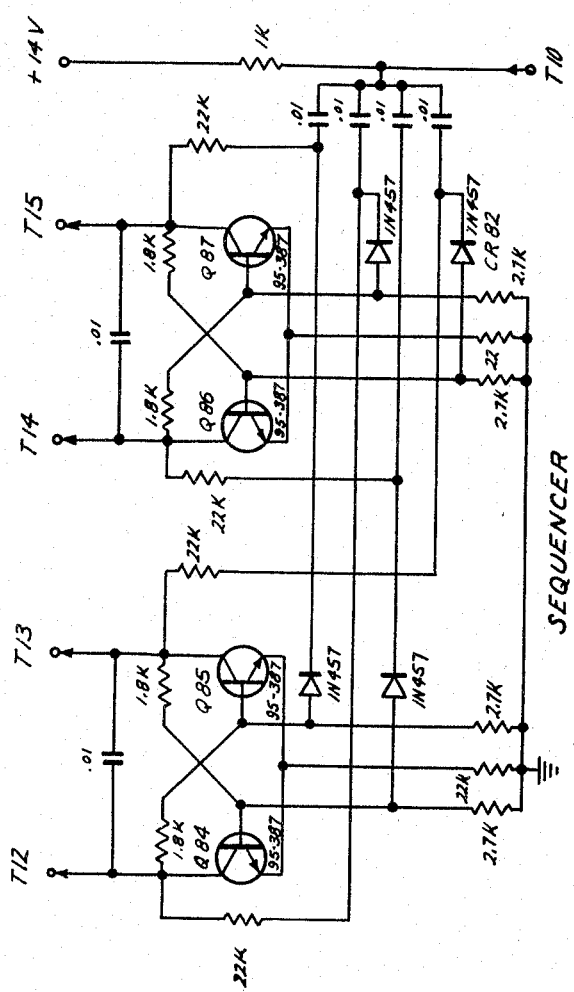
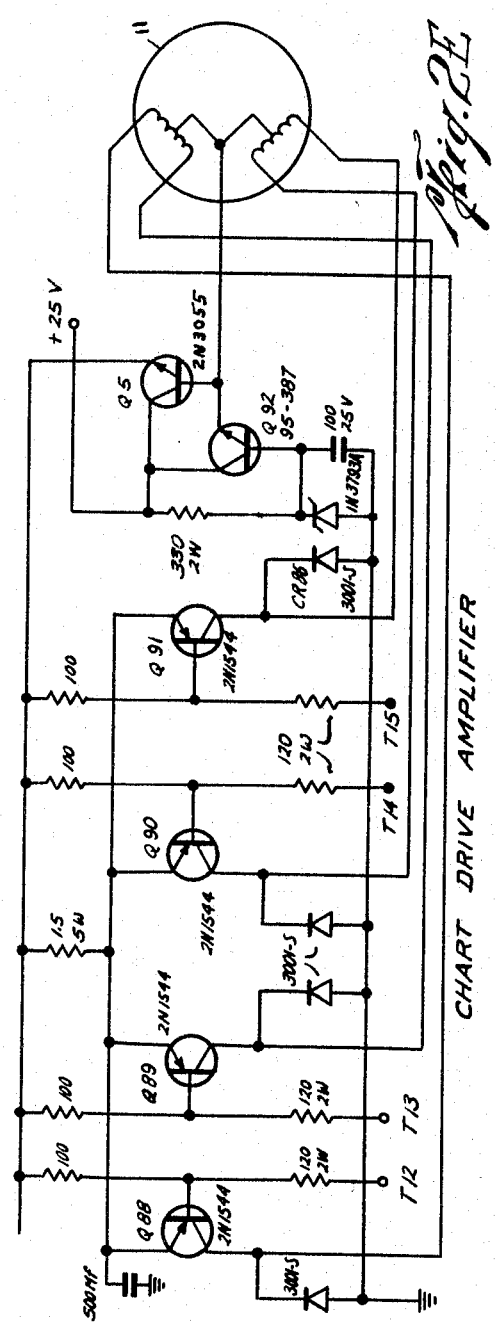
Edward V. Hardway, Jr.
INVENTOR.

United States Patent Office 3,319,252
Patented May 9, 1967

3,319,252
GRAPHIC RECORDER FOR SEQUENTIAL
PLOTTING OF ANALOG VALUES
Edward V. Hardway, Jr., Houston, Tex., assignor to
Houston Instrument Corporation, Houston, Tex.
Filed Feb. 15, 1966, Ser. No. 527,589
8 Claims. (Cl. 346—32)

ABSTRACT OF THE DISCLOSURE

This invention relates to a strip chart recorder wherein the chart is stepped a predetermined distance along the X-axis responsive to a stepping signal internally generated in the recorder. The stepping signal is generated responsive to the print out of a bit of information and independently of any analog signal generated in a multichannel source feeding information to the recorder.

This invention relates to a graphic recorder for plotting analog values from a multichannel source and especially to one capable of operating at high speeds and in a manner permitting positive and easy channel identification even though the number of channels sequentially recorded may be in the thousands.

In the past, it has been common to sequentially record data from a number of different channels on a strip chart recorder. For example, a number of channels each representing a pressure, a temperature, etc. may be scanned by a stepping switch or other means and the data from each channel recorded on the strip chart. In such recorders, the chart is moved under a pen or printing head by a synchronous motor which moves the chart a predetermined distance following the lapse of a given time interval so that there is an equal time interval for the printing out of each channel. Such allotted time is made materially greater than the full scale balance time of the recorder with the result that there is a period of "dead time" after a channel has been read out and before the recorder is switched to a succeeding channel. However, speed is not critical because of the small number of channels, normally less than 24. Such recorders are economically unsuited to multichannel analyzer read-out because of the length of time required to plot each channel.

Heretofore, almost all multichannel analyzers have used an X-Y recorder for recording the data stored in their channels. Originally many multichannel analyzers were hundred channel units with digital to analog conversion internally available to provide analog signals which were used by the recorder to position the recorder head along the X axis to identify the channel and along the Y axis to identify the magnitude of the stored data. A clock in the analyzer was used to advance the scanning mechanism from one channel to the next and to determine the amount of time available for read-out of each channel. The latter was made long enough to allow the recorder to balance out on the Y axis prior to printing a point and moving to the next channel or a pen would draw a continuous trace if channel identification were not important. Although X or "channel number axis" analog calibration was required, this was not difficult with only one hundred channels allotting 0.1 inch per channel on 8½″ graph paper.

However, as the number of analyzer channels increased to 256, 400, 1,024, 4,096, and up, read-out time became more costly, channel identification became more difficult, if not impossible, and X axis analog calibration became more critical. The largest available X-Y recorders for the application had 15 inch total travel along the X axis. Almost 7 minutes were required to read-out as few as 400 channels.

The next development was to modify these X-Y recorders by adding a sensitive null detector on both axes to permit faster channel advance for small excursions. However, a large overshoot time delay was required prior to plotting and interrogating the next successive channel to permit the sensitive null detector setting needed for adequate accuracy. Such recorders were not sufficiently fast in operation to satisfy many requirements. They did nothing to improve resolution for channel identification.

In these X-Y multichannel recorders, the analog signal for channel identification or X axis positioning was normally in the form of a stair-step voltage with an incremental increase or decrease in voltage being provided from channel to channel. The incremental increase in voltage from one channel to another was thus used to cause the recorder head to move a discrete distance along the X axis. Since there is a practical limit in the total voltage available to be divided up among the various channels to form the stair-step voltage, the difference in voltage from one channel to another must necessarily become smaller as the number of channels increase. While as indicated above this caused little difficulty where only one hundred channels were involved, the problem became almost insurmountable when several thousands of channels must be scanned. The difference in voltage from channel to channel must necessarily become so very small that even the most sensitive null detector cannot reliably provide sufficient resolution for channel identification. Thus, positioning of the channel read-out with respect to the grid lines of the chart paper becomes erratic. Moreover, the small incremental voltages emphasize the problem of zero drift peculiar to the analyzer or the recorder.

It is therefore an object of this invention to provide a graphic recorder for the sequential plotting of analog values from a multichannel source on a chart wherein the chart or the chart marking means is moved or stepped a predetermined distance along the X axis responsive to a signal internally generated in the recorder indicating that a plot has been completed for a channel thereby rendering X axis positioning independent of any signal independently generated by the multichannel source.

Another object is to provide such a recorder in which the chart or the marking means is positively moved a predetermined distance for each channel regardless of the total number of channels involved and in which the recorder is switched to a succeeding channel upon completion of the recording of the data from the previous channel thereby virtually eliminating any "dead time" and speeding up the recording operation.

Another object is to provide such a recorder which has the capacity for recording information from an almost unlimited number of channels and yet a predetermined resolution can be maintained between channels.

Another object is to provide such a recorder which does not require any null sensing servomechanism for determining the X axis position of the marking means for the chart thereby eliminating the need for X axis calibration and overcoming the problem of zero drift which have heretofore been encountered.

Other objects, advantages and features of the invention will be apparent to one skilled in the art upon consideration of the specification, claims and the drawings, wherein:

FIG. 1 is a block diagram illustrating a preferred embodiment of the invention connected to a multichannel source of stored information; and FIGS. 2 through 2E illustrate a preferred detailed circuit forming a part of the preferred embodiment of the invention.

In the drawings, the pair of terminals marked $T_1$ indicate they are to be connected together. Similarly, the pairs of terminals marked $T_2$–$T_{15}$ indicate they are to be respectively connected together.

Referring to the drawings, wherein resistance is shown in ohms and capacitance is shown in microfarads, bits of information are stored in each channel of a memory section of a multichannel source 1, such as a multichannel analyzer, which bits are to be recorded along the Y-axis of the graphic recorder. This information in the form of a voltage is fed into a servomechanism input for driving a chart marking means to a null point. Thus the input voltage is fed to an attenuator 2 and the resulting voltage is compared with a reference voltage from a reference voltage supply 3 by a chopper 4 and servo amplifier 5. Any resulting error signal causes the servo motor 6 to drive the wiper 7 on a rebalance potentiometer 8 to a null point. The servo motor 6 is also connected to the chart marking means, such as character printer 9, to move it along the Y axis to a null position proportioned to the amplitude of the input signal.

Means are provided for generating a null signal when the marking means 9 has been moved by the servomechanism to at least approximately its null position. Referring to FIGS. 1 and 2, a means is provided for sensing the rate of movement of the record making mechanism along the Y axis which can also generate a rate signal responsive to such movement or otherwise generate a signal indicating that a null has been achieved. In the preferred embodiment shown, this means includes a tachometer 10, which generates such a rate signal, a null detector circuit as shown in FIG. 2 and an "OR" gate also shown in FIG. 2, which produces a signal responsive to the marking means being moved to null position. When an analog signal is received from the multichannel source, and is fed into the Y axis circuit, as described above, the marking means 9 is moved along the Y axis in response to the resulting error signal.

Referring to FIG. 2, the tachometer output is fed to the null detector circuit via terminal T–1. Transistor Q–28 serves as a phase splitter to feed opposite polarity signals to amplifiers composed of transistors Q–29 and Q–32. These outputs are fed through emitter follower transistors Q–30 and Q–31 to a bridge rectifier composed of diodes CR–29, 30, 31, and 32. The signals are then filtered by resistors R–93, R–94 and condenser C–43. Appearing at resistor R–95 is an attenuated tachometer signal which has been converted from A.C. to D.C. This filtered signal is then shaped into a positive pulse by a level detector whose output holds an OR gate armed while the servomechanism is moving the marking means toward a null position. Transistors Q–33 and Q–34 form the level detector which determines whether or not the input signal is changing by switching from one state to another as the tachometer voltage exceeds or falls within a certain value. This output is fed to the OR gate formed by transistors Q–35 and Q–36.

When the level detector output falls to a predetermined low value, that is, when the servomechanism has moved the marking means to at least approximately null position, the output of the OR gate at resistor R–103 decreases toward or to zero. This negative going voltage is differentiated by condenser C–45 and resistor R–113 (FIG. 2A) and the resulting pulse can be termed a null signal. Thus, there is provided means for generating a null signal when the marking means has been moved by the servomechanism to at least approximately the null position.

While a continuous line marking means, such as a pen, can be used in some instances as discussed below, it will ordinarily be preferred to use a character printer so as to make a point plot. Such an arrangement is illustrated in the drawings. Thus as shown in FIG. 2A, the null signal is passed to a printer driver circuit to cause the character printer 9 to plot a point on the strip chart. In order to assure that the character printer has completed its plot before an advance signal is sent to the multichannel source to cause it to advance the recorder to the next channel, means are provided delaying the sending of an advance pulse to the multichannel source until the character printer has been energized and has completed its function. In FIG. 2A this is shown as comprising transistors Q–37 and Q–38 connected as a one-shot multivibrator having a three millisecond period. Thus the null signal at the output of the differentiating circuit comprising condenser C–45 and resistor R–113 is used to trigger the one-shot on. The resulting three millisecond delay pulse at the collector of Q–37 is passed via diode inhibit gate C–88 to transistor Q–95 which is a common emitter inverter. This results in the reduction of voltage applied to the base of Q–95 causing base driven transistors Q–94 and Q–96 to turn on power transistor Q–1. The latter supplies the necessary power to drive the printer solenoid L–1 which, when energized, causes an armature (not shown) to move a character down and cause a print on the strip chart. When the one-shot multivibrator times out, the resulting signal causes Q–95 to act through Q–94 and Q–96 to shut off Q–1 thereby de-energizing the character printer coil L–1. The period of the multivibrator can vary but should be long enough to supply sufficient energy and provide enough time for the character printer to make a plot on the strip chart.

In the preferred form, means are provided which are responsive to the null signal for generating an advance signal for causing the multichannel source to advance the servomechanism input to the next channel. This is illustrated in FIG. 2B as including the completed plot command circuit or generator. Thus, transistors Q–39 and Q–40 form a one millisecond time delay circuit in the form of a one-shot multivibrator. The latter is triggered to an "on" condition by the trailing edge of the printer three millisecond delay pulse via terminals $T_4$. Its one millisecond positive 27 volt pulse is fed through resistor R–120 to transistor Q–41. Q–41 inverts the pulse and turns transistor Q–42 on for one millisecond in order to reset the completed plot command pulse generator formed by unijunction transistor Q–43 and transistor Q–44. This pulse generator is so designed as to be normally free running to generate a chain of pulses each of which are, in the preferred embodiment, approximately 1,500 milliseconds apart although this can vary as will be explained below. However, when transistor Q–42 is turned on for one millisecond as described above, the cycling of the pulse generator is interrupted and this output at the collector of transistor Q–44, which is normally zero, rises to +27 volts for 15 milliseconds. The latter time period is not critical and can vary considerably, the important consideration being that a positive going signal is generated. The resulting advance signal is amplified in Q–46 to provide a negative source of advance signals and to also improve the leading edge thereof. The negative going advance signal is also fed to transistor Q–47 which inverts it to provide a positive source of advance signals. The resulting sources of negative and positive advance signals are connected to a polarity switch SW–1 which determines the polarity of the completed plot command or advance signal which is to be fed to the multichannel source. The selected signal is fed to transistors Q–48 and Q–49 which compose a Darlington emitter follower used to lower the output impedance of the completed command pulse generator. The output at the collector Q–48, which may be positive or negative depending upon the setting of switch SW–1 as required by the mulitichannel source to cause it to switch channels, is then fed through an amplitude control adjustment R–1 and then via terminal T–6 to the multichannel source to cause it to advance one channel.

If desired, an inhibit gate in the form of a transistor Q–45 can be connected across the output of the advance signal pulse generator and biased to an "on" condition to inhibit a completed plot command pulse output while the marking means is in an "off" null condition by applying the rate signal via terminals T–2 thereto. This prevents any spurious signals from causing a false plot command signal to be emitted while the recorder is moving its marking means to a null condition.

In the preferred embodiment, means are provided which, responsive to the completed plot command or advance signal, prevents any spurious signals during the initial portion of the cycle from falsely causing the actuation of the character printer, and also after a predetermined time, causes actuation of the character printer so as to generate an advance signal should a null signal not be generated for any reason. This prevents "hang-up" of the recorder on one channel, such as might occur should the Y axis excursion for any given channel be insufficient to generate a null signal. Thus referring to FIG. 2B, there is shown what may be called a force plot delay circuit. This circuit includes a one-shot multivibrator composed of transistors Q–64 and Q–66 and a timing capacitor C–56 which is chosen, in conjunction with the other components of the circuit, to give a timing cycle which is long enough to extend over the initial portion of the cycle while the strip chart is being advanced to the next channel position. The time interval is also made long enough for the marking means to make a reasonably small excursion along the Y axis. In the illustrated circuit, a forty-seven millisecond pulse is generated which is longer than the time required for the chart drive mechanism to advance the chart as described below. It is substantially longer than the time required for the marking means to move 0.3 inch. At any rate, the advance signal is fed via terminal T–7 to the multivibrator to trigger it on and the resulting signal is applied via terminal T–8 to the OR circuit to arm it, thereby inhibiting passage of any signals generated ahead of the OR circuit. When the multivibrator times out, the trailing edge of the signal disarms the OR gate causing a null signal resulting in a forced plot unless the null detector circuit has applied a rate signal to the OR circuit by that time. If it has, the OR gate will remain armed and a null signal will not be emitted until the rate signal has decreased to be below a predetermined value.

If desired, a transistor Q–65 can be added, as shown, to provide a fast rise time on the leading edge of the output pulse.

Means are also provided which are operable responsive to the null signal, and independently of any analog signal generated by the multichannel source, to advance the strip chart a predetermined distance along the X axis. Preferably, such means is made responsive to the advance signal especially when a point plotting type of marking means is used. Conveniently, the leading edge of the force plot delay signal can be used to trigger a control circuit for the chart drive stepper motor 11 (FIG. 1) which is mechanically connected to the strip chart drive mechanism to cause it to advance the strip chart a predetermined distance each time the motor is stepped one increment.

In the preferred embodiment, the control circuit for the stepper motor includes means for varying the resolution or distance between successive channel plots. This is shown in the drawings as an X resolution generator with the detail of the preferred circuit being shown in FIG. 2C. This generator is illustrated as including four one-shot multivibrators in series and connected so that four successive pulses are generator. A selected number of these pulses, depending upon the setting of resolution switch SW–2, are used to step the chart drive motor one, two, three or four increments. The first one-shot multivibrator is triggered via T–8 by the leading edge of the force plot delay signal. It is composed of transistors Q–74 and Q–75 and is conveniently timed at ten milliseconds but its output is differentiated to a one millisecond pulse by condenser C–71 and resistor R–209 before reaching diodes CR–61, CR–62, CR–64 and CR–67. The trailing edge of the first one-shot multivibrator is differentiated by condenser C–66 and resistor R–191 and is used to trigger the second one-shot multivibrator formed by transistors Q–76 and Q–77. This circuit is conveniently timed at eight milliseconds and its output is differentiated and applied to the diode matrix as illustrated in the drawings. The process repeats itself by trigging the third one-shot multivibrator composed of transistors Q–78 and Q–79 followed by triggering of the fourth one-shot multivibrator composed of transistors Q–80 and Q–81. As indicated, the time between successive pulses applied to the diode matrix decreases, as for example, with delays of ten, eight, six and four milliseconds between successive one millisecond pulses. This decreases the time of chart advance, when it is to be advanced more than one increment, while at the same time assuring that the stepper motor is swept up to speed without stalling due to being saturated by an abrupt swamping of pulses. In the specific circuit shown, a 200 pole stepping motor is used and is connected to the chart drive so that the chart is advanced 0.025 inch per impulse. Thus the setting of the selector switch SW–2 will determine whether the chart is advanced 0.025, 0.050, 0.075 or 0.100 inch per advance pulse thereby affording a selection of the X axis resolution.

The wiper of the resolution switch SW–2 directs the output pulse or pulses to transistor Q–82 where they are amplified and fed to a sequencer circuit through T–10 as shown in FIG. 2D. The sequencer circuit is of conventional construction and it receives the pulse output from the X resolution generator and delivers an orderly sequence of signals to the stepper motor to excite the proper windings. Transistors Q–84, Q–85, Q–86 and Q–87 form two flip-flop multivibrators actuated by steering diode CR–82 and associated RC networks. The outputs of the four transistors are connected directly to the final power drive transistors Q–88 to Q–91 in the chart drive amplifier in FIG. 2E through terminals T–12, T–13, T–14 and T–15. The output of power transistors Q–88 and Q–91 are directly connected to the windings of the stepper motor 11 to actuate the same.

The marking means which can be used can be of two general types, one which plots points and one which makes a continuous line record. When the latter is used, it is possible in some instances to use the null detection signal directly as the advance signal to advance the multichannel source to the next channel and to trigger the stepper motor control circuit. The resulting plot will be stair-step in nature. However, when the point plot type of marking means is used, it is preferred, especially for high speed operation, to delay generating an advance signal until the character printer has been energized and made its plot on the chart. This assures that the multichannel source does not advance the recorder to a succeeding channel before the print-out is made and also assures that the chart is not advanced until after print-out. In this connection, the advance pulse can be used directly to trigger the stepper motor control circuit as can the print-out pulse which is sent to energize the advance pulse generator. However, each particular case will have its own individual advantages and disadvantges and the foregoing does indicate the flexibility of the system.

The specific description given above relates to stepping a strip chart along the X axis after a channel is plotted. It is possible to step the marking means along the X axis after each channel is recorded. When it is desired to use a strip chart under the latter condition, the chart can remain fixed until the marking means reaches its limit on the X axis. Then both the marking means and the strip chart can be moved back to what normally would be "zero" on the X axis following which the strip chart would remain stationary while the marking means made another series of plots along X axis. Also, if desired, regular X–Y plot paper could be used where the number of channels permits their being plotted on the selected size of X–Y paper. In this case, the marking means would be stepped across the paper and this could occur through a number of cycles across the paper if the nature of the character was changed after each cycle to permit channel identification. Thus 100 channels might be printed across the paper using a dot character, the printing means returned to "zero" and the character changed to an "X," etc. However, normally a strip chart will be preferred due to its many apparent advantages.

While the force plot delay circuit has been indicated above to be physically located within the recorder, it can be located in other positions, such as within the housing for the multichannel source. Also, it is possible to trigger the force plot delay circuit with a signal or pulse generated by the multichannel source responsive to the completed plot command signal as indicated by the dashed line in FIG. 1 (terminal T–7 in FIG. 1 then being opened). This would, in effect, delay arming the OR gate until the multichannel source was ready to send information to the recorder so as to cause a rate signal to be generated within the time allotted by the force plot delay circuit. For example, the multichannel source may not be able to send an information signal to the servomechanism to cause it to generate a rate signal until fifty milliseconds after it has received a completed plot command signal. In such case, the source could send a signal to trigger the force plot delay circuit about fifty milliseconds after it receives a completed plot command signal.

While reference has been made to certain delay times and pulse widths and periods, these are meant to be illustrative only and one skilled in the art can adjust these to suit any particular circumstance. Similarly, specific circuits and components thereof have been disclosed and these can be varied by one skilled in the art and yet obtain useful results similar to those obtained by the specifically described circuits.

From the foregoing, it will be seen that this invention is one well adapted to attain all of the ends and objects hereinabove set forth, together with other advantages which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a graphic recorder for high speed and sequential plotting of analog values from a multichannel source on a chart, the combination of: marking means mounted for movement along the Y axis of the chart and adapted to plot a record of said analog values on the chart; a servomechanism operable responsive to an input analog signal from said multichannel source to move the marking means along the Y axis of said chart to a null position proportional to the amplitude of said input signal; means generating a null signal when said marking means has been moved by the servomechanism to at least approximately said null position; means responsive to said null signal to cause the multichannel source to advance the servomechanism input to the next channel; and means operable responsive to said null signal, and independently of any analog signal generated by said multichannel source, to step one of said chart and said marking means relative to the other a predetermined distance along the X axis.

2. The recorder of claim 1 wherein the penultimate means includes means for generating an advance signal responsive to said null signal, said advance signal being adapted to cause said multichannel source to advance the servomechanism input to the next channel, and wherein the last mentioned means is responsive to said advance signal.

3. The recorder of claim 1 wherein the last mentioned means includes a stepper motor for advancing said chart stepwise, and pulse generating means connected to said motor and responsive to said null signal to generate a predetermined number of pulses to step said motor a corresponding number of times.

4. The recorder of claim 1 wherein said marking means includes a printer actuatable to plot a character on the chart, a circuit actuating the printer responsive to receipt of said null signal, and time delay means delaying advancing the servomechanism input to the next channel until said circuit has actuated said printer and until such character has been printed out on said chart.

5. In a graphic recorder for high speed and sequential plotting of analog values from a multichannel source on a strip chart, the combination of: marking means mounted for movement along the Y axis of the strip chart and adapted to plot a record of said analog values on the chart; a servomechanism operable responsive to an input analog signal from said multichannel source to move the marking means along the Y axis of said chart to a null position proportional to the amplitude of said input signal; means generating a null signal when said marking means has been moved by the servomechanism to at least approximately said null position; means responsive to said null signal for generating an advance signal for causing the multichannel source to advance the servomechanism input to the next channel; and means operable responsive to and upon receipt of said advance signal, and independently of any analog signal generated by said multichannel source, to advance said chart a predetermined distance along its X axis.

6. The recorder of claim 5 wherein the last mentioned means includes a stepper motor for advancing said chart stepwise, and pulse generating means connected to said motor and responsive to said advance signal to generate a predetermined number of pulses to step said motor a corresponding number of times.

7. The recorder of claim 6 wherein means are provided for selecting the number of pulses fed to the motor, said pulse generating means generating said pulses with decreasing time intervals between successive pulses.

8. The recorder of claim 5 wherein said marking means includes a printer actuatable to plot a character on the chart, a circuit actuating the printer responsive to receipt of said null signal, and time delay means delaying generating said advance signal until said printer has plotted said character.

References Cited by the Examiner

UNITED STATES PATENTS

| | | | |
|---|---|---|---|
| 3,034,125 | 5/1962 | Gonzenbach | 346—79 |
| 3,125,400 | 5/1964 | Moyano | 346—34 |

RICHARD B. WILKINSON, *Primary Examiner.*

J. W. HARTARY, *Assistant Examiner.*